(12) United States Patent
Yen et al.

(10) Patent No.: US 12,502,501 B2
(45) Date of Patent: Dec. 23, 2025

(54) WEARABLE SUPPORT DEVICE

(71) Applicant: National Taiwan University Hospital, Taipei (TW)

(72) Inventors: Hsiao-Ching Yen, Taipei (TW); Jer-An Guo, Taipei (TW)

(73) Assignee: National Taiwan University Hospital, Taipei (TW)

( * ) Notice: Subject to any disclaimer, the term of this patent is extended or adjusted under 35 U.S.C. 154(b) by 730 days.

(21) Appl. No.: 17/944,304

(22) Filed: Sep. 14, 2022

(65) Prior Publication Data

US 2023/0414892 A1  Dec. 28, 2023

(30) Foreign Application Priority Data

Jun. 22, 2022  (TW) .................................. 111123311

(51) Int. Cl.
*A61M 16/04* (2006.01)
*A61M 16/08* (2006.01)

(52) U.S. Cl.
CPC ..... *A61M 16/0497* (2013.01); *A61M 16/0816* (2013.01); *A61M 16/0833* (2014.02); *A61M 2209/088* (2013.01)

(58) Field of Classification Search
CPC . A61M 25/0206; A62B 9/04; B63C 2011/026
See application file for complete search history.

(56) References Cited

U.S. PATENT DOCUMENTS

| | | | | |
|---|---|---|---|---|
| 4,574,798 A | * | 3/1986 | Heitzman | A61M 25/02 128/207.14 |
| 5,244,464 A | * | 9/1993 | Madden | A61M 25/02 604/179 |
| 5,672,159 A | * | 9/1997 | Warrick | A61M 16/0683 604/179 |
| 2006/0032647 A1 | * | 2/2006 | Petty | B05B 1/30 173/115 |
| 2009/0078259 A1 | * | 3/2009 | Kooij | A61M 16/0875 128/205.25 |
| 2017/0254356 A1 | * | 9/2017 | Brose | F16C 11/04 |
| 2021/0244904 A1 | * | 8/2021 | Perrie | A61M 16/0497 |

FOREIGN PATENT DOCUMENTS

| | | | | |
|---|---|---|---|---|
| DE | 202015005880 U1 | * | 11/2015 | A62B 9/04 |
| ES | 2717690 A1 | * | 6/2019 | A61M 25/02 |

* cited by examiner

*Primary Examiner* — Bradley H Philips

(57) ABSTRACT

A wearable support device includes a first base, a second base, a plurality of belts and a fixed frame. The first base is formed with a first through hole. The second base is formed with a second through hole. The belts penetrate the first and the second through holes. The fixed frame includes a side wall, a support portion, a first and a second protruding portions; the support portion and the protruding portions are disposed on the side wall and positioned on the first base, the protruding portions are located above the support portion, a support space is formed among the support portion and the protruding portions, a through groove is formed between the support portion and the protruding portions respectively, and a third through groove is formed between the two protruding portions, and all of the through grooves are in communication with the support space respectively.

10 Claims, 15 Drawing Sheets

WEARABLE SUPPORT DEVICE

CROSS-REFERENCE TO RELATED APPLICATION

This application claims the priority of Taiwanese patent application No. 111123311, filed on Jun. 22, 2022, which is incorporated herewith by reference.

BACKGROUND OF THE INVENTION

1. Field of the Invention

The present invention relates generally to a wearable support device, and more particularly, to a wearable support device for supporting a respirator tube and an endotracheal tube.

2. The Prior Arts

Up to 80% of critically ill patients are indwelling endotracheal tubes (inserted into the patient's trachea through the nostrils or mouth) and use artificial respirator to assist ventilation to maintain life or as adjuvant therapy during the stay in the intensive care unit. To give artificial respirator to assist ventilation, in addition to inserting the endotracheal tube itself into the patient's trachea, it also needs to be connected between the artificial respirator and the endotracheal tube through the respirator tube. The respirator tube includes a Y-shaped tube, an exhalation tube, an inhalation tube and an elbow joint. One end of the exhalation pipe, one end of the inhalation pipe and one end of the elbow joint are respectively connected to the three connecting ends of the Y-shaped tube, the other end of the exhalation pipe and the other end of the inhalation pipe are connected to the artificial respirator, and the other end of the elbow joint is connected to the endotracheal tube.

When the patient performs early rehabilitation activities (for example, sitting on the bedside, standing on the bedside, stepping on the bedside or getting out of bed, etc.), the patient is under the influence of gravity when the body is upright. The respirator tube is easy to move downward, and the following two problems occur: First, the elbow joint will be pulled down by the Y-shaped tube, so that the relative position of the elbow joint and the Y-shaped tube cannot be kept fixed, which will cause the endotracheal tube to detach from nasal cavity or oral cavity; second, the elbow joint will be excessively bent, increasing the resistance of the artificial respirator when inputting gas, resulting in insufficient ventilation into the patient's body.

The conventional vertical support frame is usually set at the bedside or bed, and the respirator tube is hung on the vertical support frame, and the vertical support frame can support the respirator tube. However, due to the insufficient length of the respirator tube and the difficulty in controlling the degree of tension, when the patient is in an upright state, under the influence of gravity, the respirator tube is easy to move down, or even fall off the vertical support frame and to the ground. Therefore, the conventional vertical support frame is only suitable for use when the patient is in bed, and is not suitable for use when the patient performs early rehabilitation activities.

The conventional wearable support frame includes a base, a belt and a fixed frame. The belt passes through the base and is worn on the neck, so that the base is fixed under the neck, and the tightness of the belt can be adjusted, the fixed frame presses the endotracheal tube or elbow joint toward the patient's body and fixes it on the slot of the base. The conventional wearable support frame has the following problems: first, the fixed frame is easy to crush the elbow joint and the endotracheal tube; second, the fixed frame is prone to excessively press down the endotracheal tube, causing the interior of the endotracheal tube to push upwards; when reaching the throat, the patient will feel severe discomfort and even suffocation due to foreign body infarction; third, some patients will have a central venous catheter placed in the internal jugular vein of the neck, and the belt will easily compress the central venous catheter, resulting in infection; fourth, the position of the base is too high, which cannot make the trunk effectively support the weight of the respirator tube; fifth, the length of the expiratory tube and the inspiratory tube are not fixed and the fixation of the fixed frame is insufficient; when the patient performs early rehabilitation activities, the expiratory tube and the inspiratory tube are easy to shake; sixth, the endotracheal tube or the elbow joint is positioned in the way of one-way clamping to the slot of the base, and the fixing effect is poor; when the patient performs early rehabilitation activities, the endotracheal tube or the elbow joint may slip out of the slot and become loose.

SUMMARY OF THE INVENTION

A primary objective of the present invention is to provide a wearable support device, which can indirectly use the chest cavity to support the weight of the respirator tube to prevent the Y-shaped tube from being displaced downward, thereby solving the problems of the prior art.

In order to achieve the aforementioned objective, the present invention provides a wearable support device for supporting a respirator tube and an endotracheal tube, comprising a first base, a second base, a plurality of belts, and a fixed frame; the first base being disposed with a plurality of first through holes, the second base being disposed with a plurality of second through holes; each of the belts passing through one of the first through holes and one of the second through holes; the fixed frame comprising a side wall, a support portion, a first protruding portion and a second protruding portion, the support portion, the first protruding portion, and the second protruding portion being all disposed on inner side of the side wall and positioned on the first base, the first protruding portion and the second protruding portion being located above the support portion, a support space formed between the support portion, the first protruding portion and the second protruding portion, a first through groove formed between the support portion and the first protruding portion, a second through groove formed between the support portion and the second protruding portion, and a third through groove formed between the first protruding portion and the second protruding portion, the first through groove, the second through groove, and the third through groove respectively communicating with the support space.

In some embodiments, the first base is disposed with three positioning grooves, the support portion, the first protruding portion and the second protruding portion are respectively protruded with a positioning column, and the positioning columns are respectively inserted in the in the positioning grooves.

In some embodiments, the wearable support device further includes a plug; wherein, the first base is disposed with an insertion hole, the insertion hole penetrates through the top of the first base and is connected with one of the positioning grooves, the positioning column of the supporting portion is disposed with a fixed hole; wherein when the positioning column of the support portion is inserted into one of the positioning groves, the fixed hole is connected to the insertion hole and the plug is inserted into the insertion hole and the fixed hole.

In some embodiments, the insertion hole includes a channel and a latch slot, the channel penetrates the top of the first base and the top wall of one of the positioning grooves, so that the channel and one of the positioning grooves communicate with each other, the latch slot penetrates the bottom wall of one of the positioning grooves, so that the slot communicates with one of the positioning grooves, and the fixed hole penetrates the top and bottom of the positioning column of the support portion; and wherein, when the positioning column of the support portion is inserted into one of the positioning grooves, the top end of the fixed hole is aligned with the channel, the bottom end of the fixed hole is aligned with the latch slot, and the plug penetrates the channel and the fixed hole and is fixed in the latch slot.

In some embodiments, an accommodating groove is disposed on the top of the first base, the insertion hole communicates with the accommodating groove, the plug includes a head and a rod, the head is accommodated in the accommodating groove, and the rod is inserted into the insertion hole and the fixed hole.

In some embodiments, four first through holes are disposed and located at four corners of the first base, respectively; four second through holes are disposed and located at the four corners of the second base, four belts are provided, and each belt passes through the first through hole of one of the corners of the first base and the second through hole in one of the corners of the second base.

In some embodiments, the side wall has a hollow portion, and the hollow portion communicates with the support space.

In some embodiments, the support portion has two inclined surfaces, and one end where the two inclined surfaces meet faces the third through groove.

In some embodiments, a side surface of the first protruding portion and a side surface of the second protruding portion are close to the third through groove and are parallel to each other.

In some embodiments, the side wall is an inverted triangle-shaped block with three vertices cut flat, and the support portion, the first protruding portion, and the second protruding portion are all isosceles triangle blocks, and the bottoms of the support portion, the first protruding portion, and the second protruding portion are respectively aligned with the three edges of the side wall formed by cutting the vertices flat.

The effect of the present invention is that the wearable support device of the present invention can indirectly use the chest cavity to support the weight of the respirator tube to prevent the downward displacement of the Y-shaped tube, so that the following effects can be achieved: first, the elbow joint will not be pulled down by the Y-shaped tube, so that the relative position of the elbow joint and the Y-shaped tube is kept fixed, thereby preventing the endotracheal tube from being separated from the nostril or oral cavity; second, the elbow joint will not bend excessively, reducing the resistance of the artificial respirator when inputting gas, so that the ventilation into the patient's body is more adequate.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
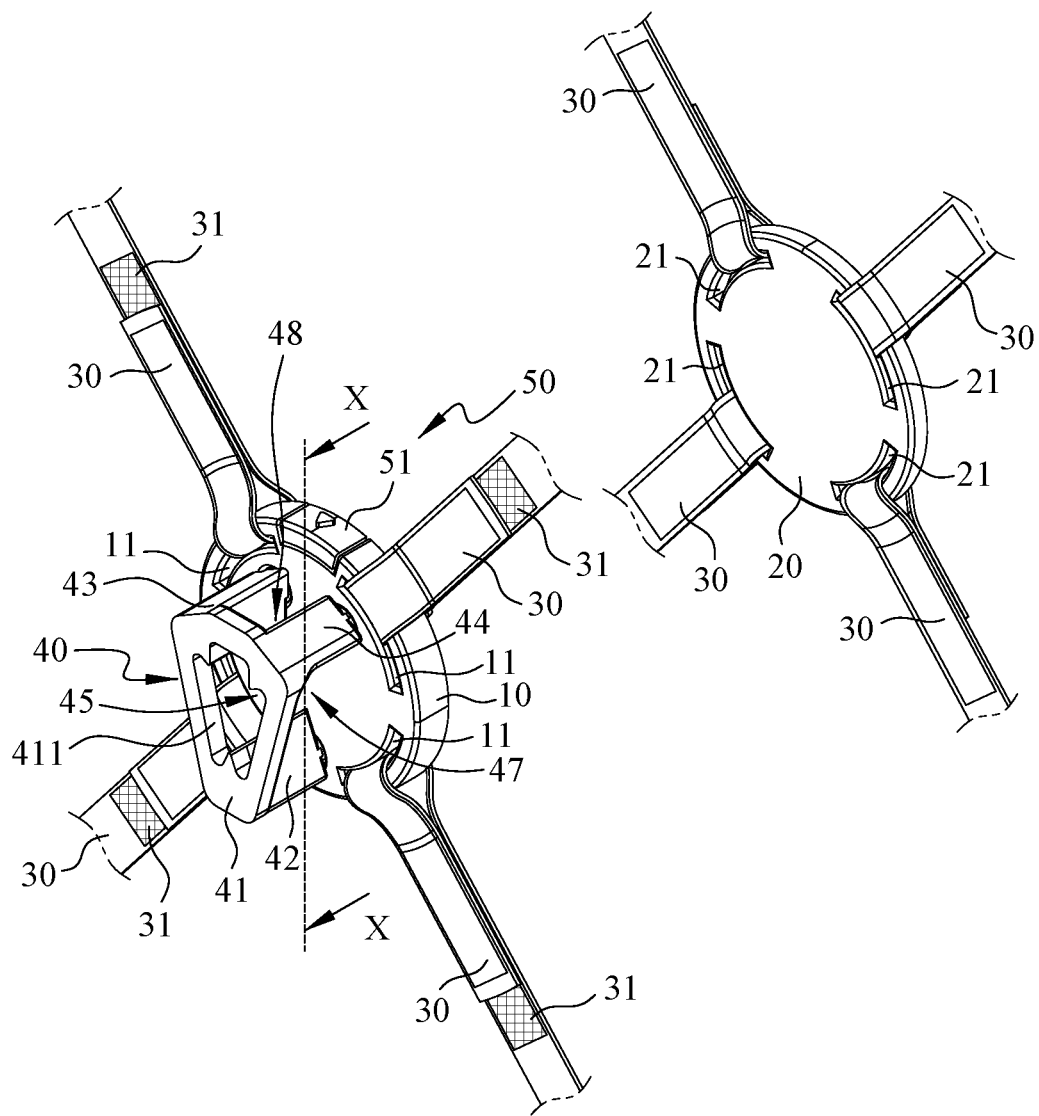
FIG. 1 is a perspective view of the wearable support device of the present invention.
Figure 2:
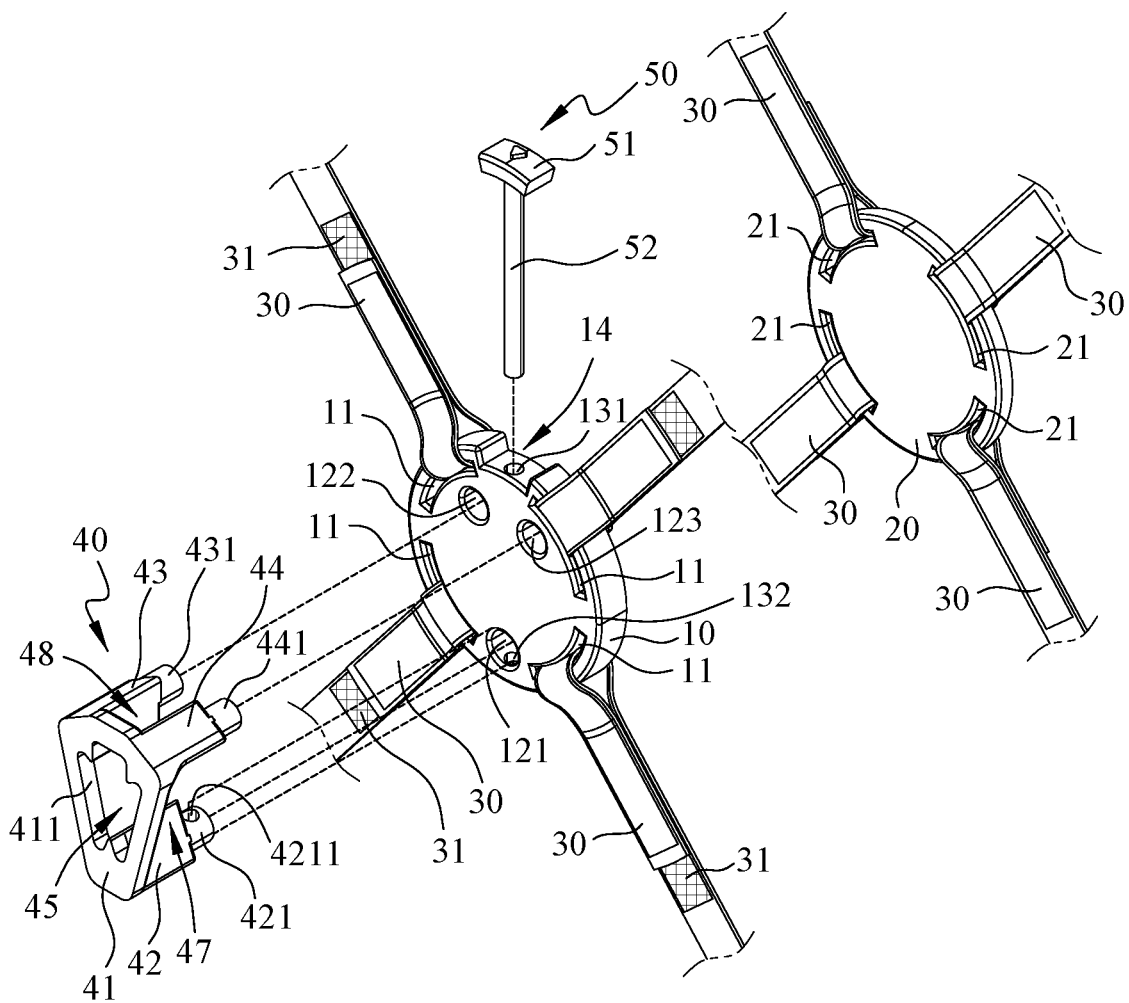
FIG. 2 is an exploded view of the wearable support device of the present invention.
Figure 3:
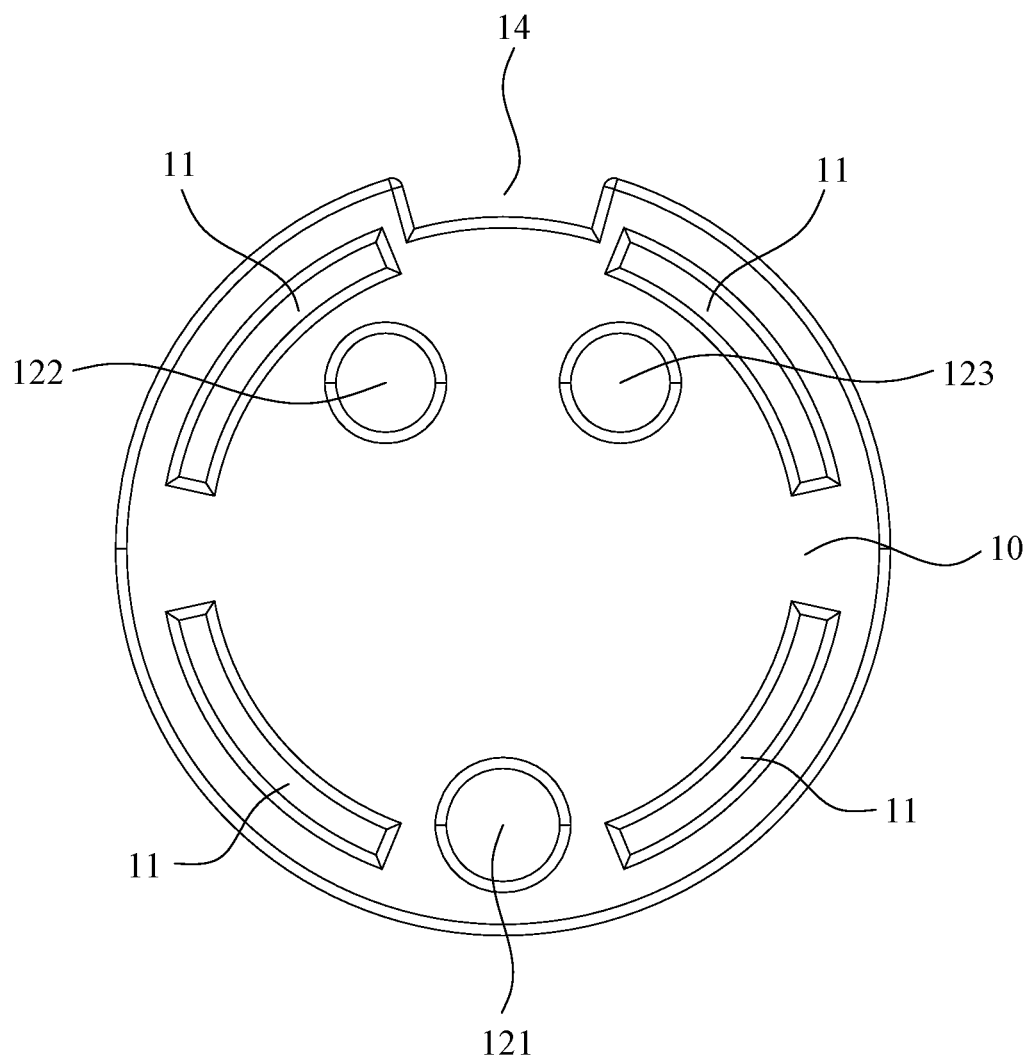
FIG. 3 is a front view of the first base of the present invention.
Figure 4:
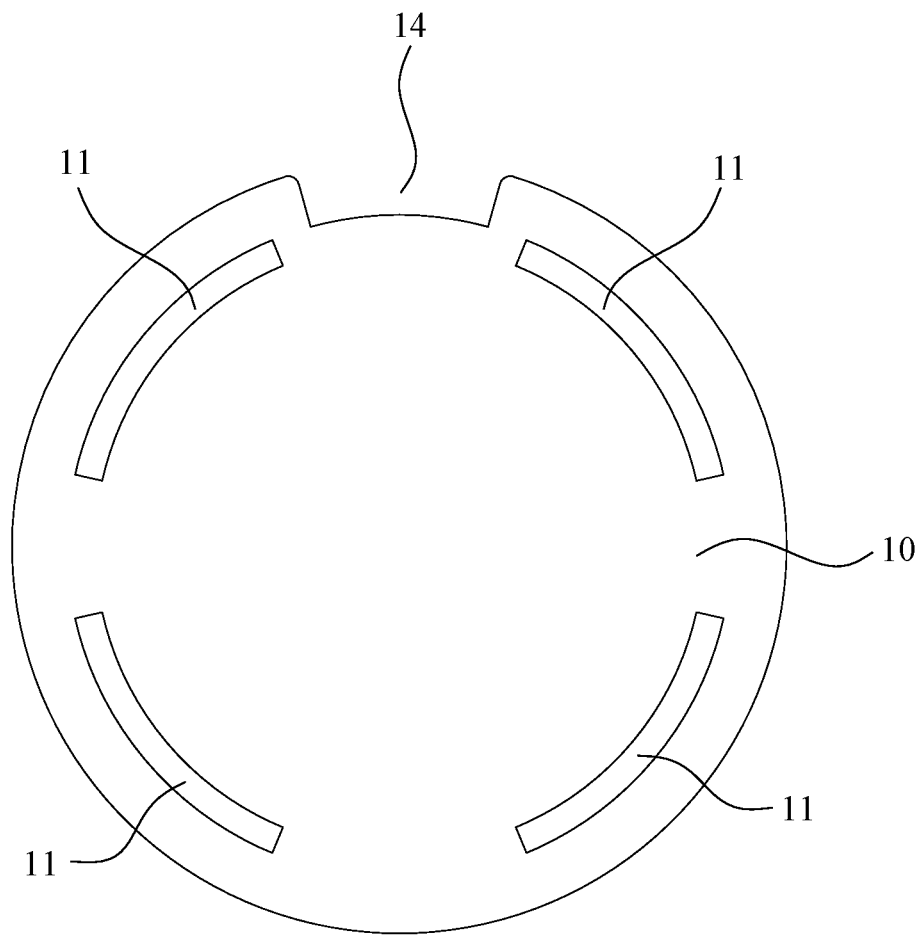
FIG. 4 is a rear view of the first base of the present invention.
Figure 5:
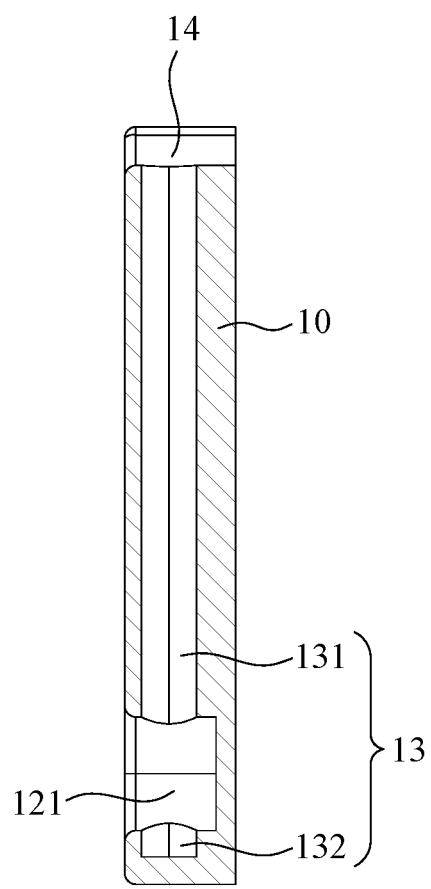
FIG. 5 is a cross-sectional view of the first base of the present invention.
Figure 6:
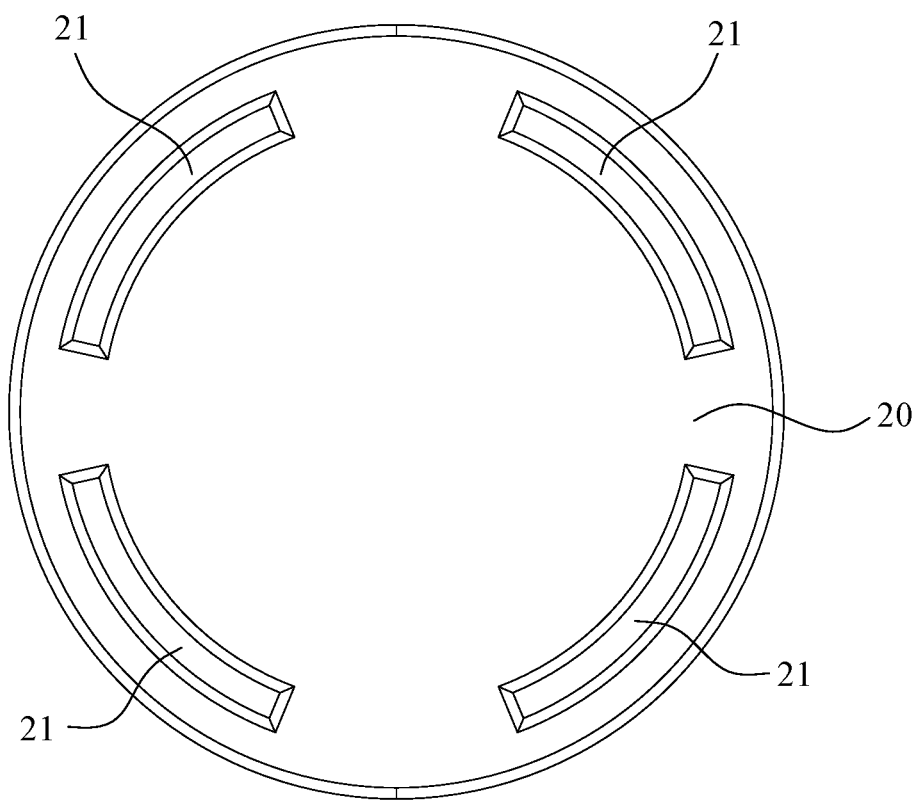
FIG. 6 is a front view of the second base of the present invention.
Figure 7:
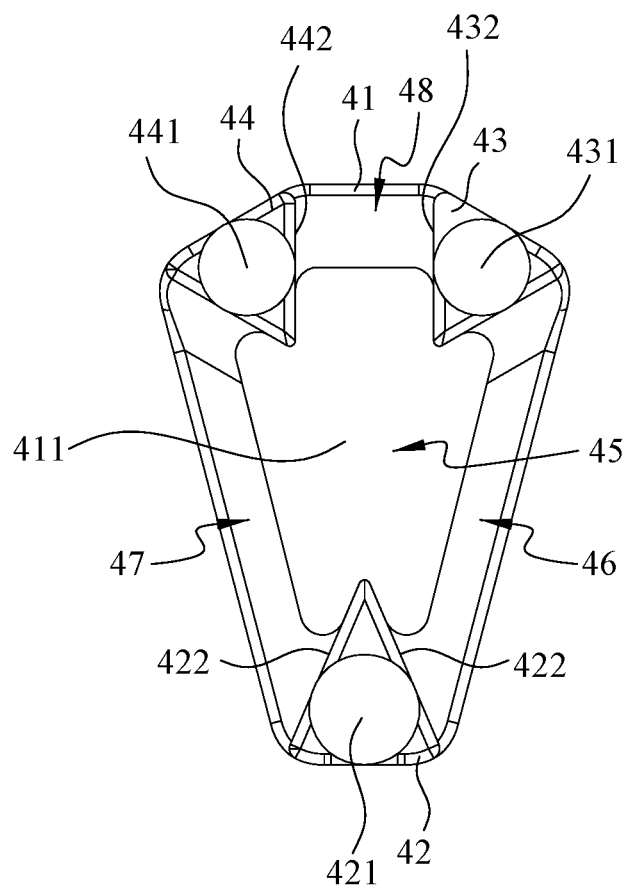
FIG. 7 is a rear view of the fixed frame of the present invention.
Figure 8:
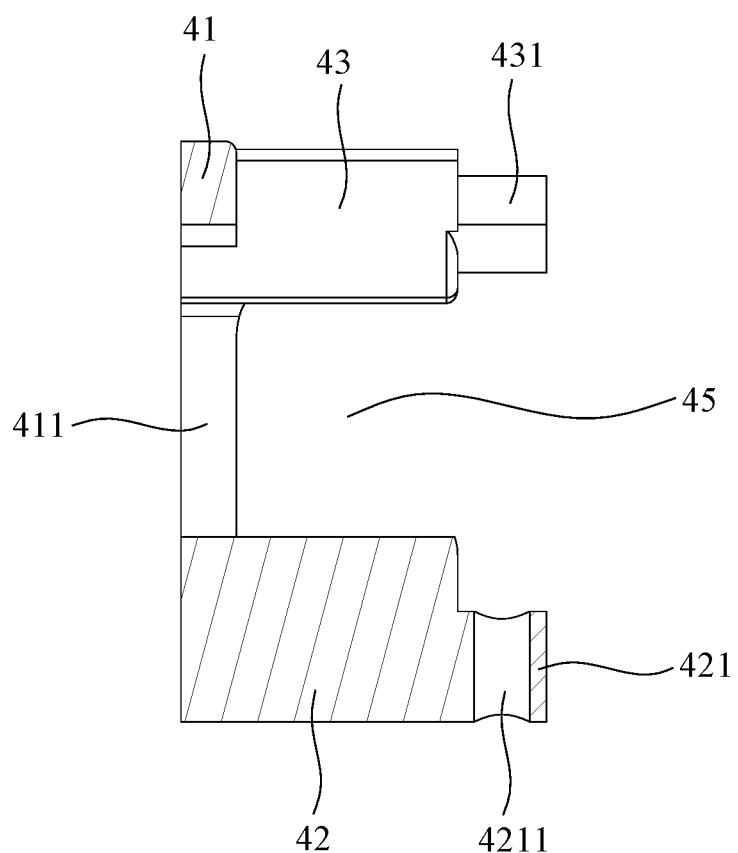
FIG. 8 is a cross-sectional view of the fixed frame of the present invention.
Figure 9:
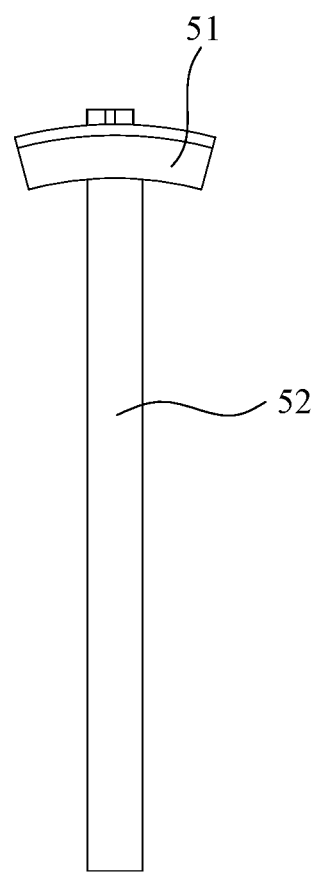
FIG. 9 is a front view of the plug of the present invention.
Figure 10:
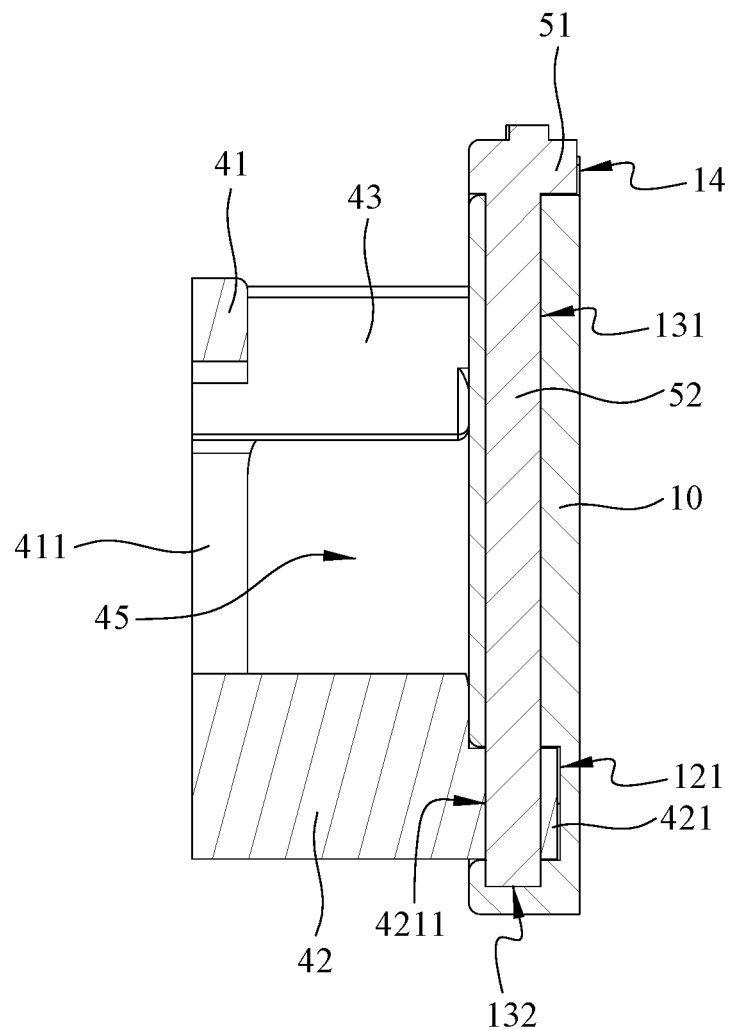
FIG. 10 is a cross-sectional view taken along line X-X in FIG. 1.

FIG. 1 is a perspective view of the wearable support device of the present invention, FIG. 2 is an exploded view of the wearable support device of the present invention, FIG. 3 is a front view of the first base 10 of the present invention, FIG. 4 is a rear view of the first base 10 of the present invention, and FIG. 5 is a cross-sectional view of the first base 10 of the present invention. FIG. 6 is a front view of the second base 20 of the present invention. FIG. 7 is a rear view of the fixed frame 40 of the present invention, and FIG. 8 is a cross-sectional view of the fixed frame 40 of the present invention. FIG. 9 is a front view of the plug 50 of the present invention, and FIG. 10 is a cross-sectional view taken along the line X-X in FIG. 1. As shown in FIGS. 1 to 10, the present invention provides a wearable support device including a first base 10, a second base 20, a plurality of belts 30, and a fixed frame 40. The first base 10 defines a plurality of first through holes 11, the second base 20 defines a plurality of second through holes 21, and each belt 30 passes through one of the first through holes 11 and the second through holes 21. The fixed frame 40 includes a side wall 41, a support portion 4, a first protruding portion 43, and a second protruding portion 44. The support portion 42, the first protruding portion 43, and the second protruding portion 44 are all disposed on the inner side of the side wall 41 and positioned on the first base 10. The first protruding portion 43 and the second protruding portion 44 are located above the support portion 42. A support space 45 is formed between the support portion 42, the first protruding portion 43 and the second protruding portion 44, a first through groove 46 is formed between the support portion 42 and the first protruding portion 43, a second through groove 47 is formed the support portion 42 and the second protruding portion 44, and a third through groove 48 is formed between the first protruding portion 43 and the second protruding portion 44. The first through groove 46, the second through groove 47, and the third through groove 48 respectively communicate with the support space 45.

The following will describe how to wear the wearable support device of the present invention and how to install the respirator tube 100 and the endotracheal tube 200 on the wearable support device of the present invention with the drawings.

Figure 11:
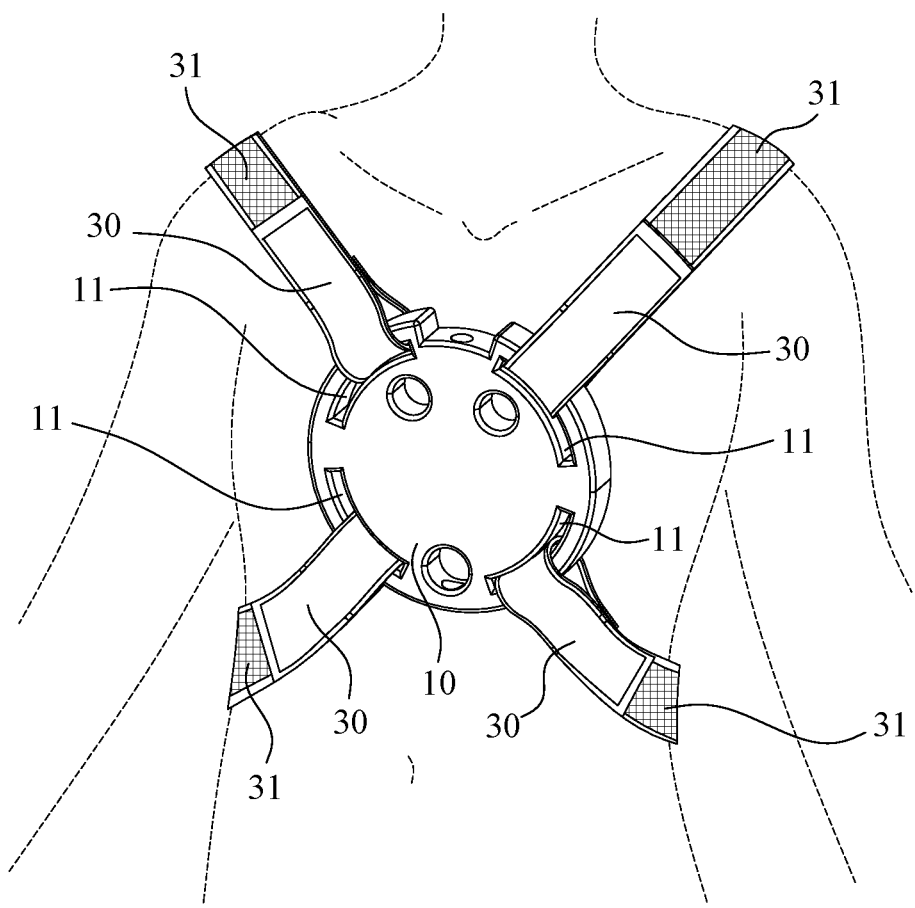
FIG. 11 is a schematic view of the first base of the present invention being worn on the front side of the chest cavity.
Figure 12:
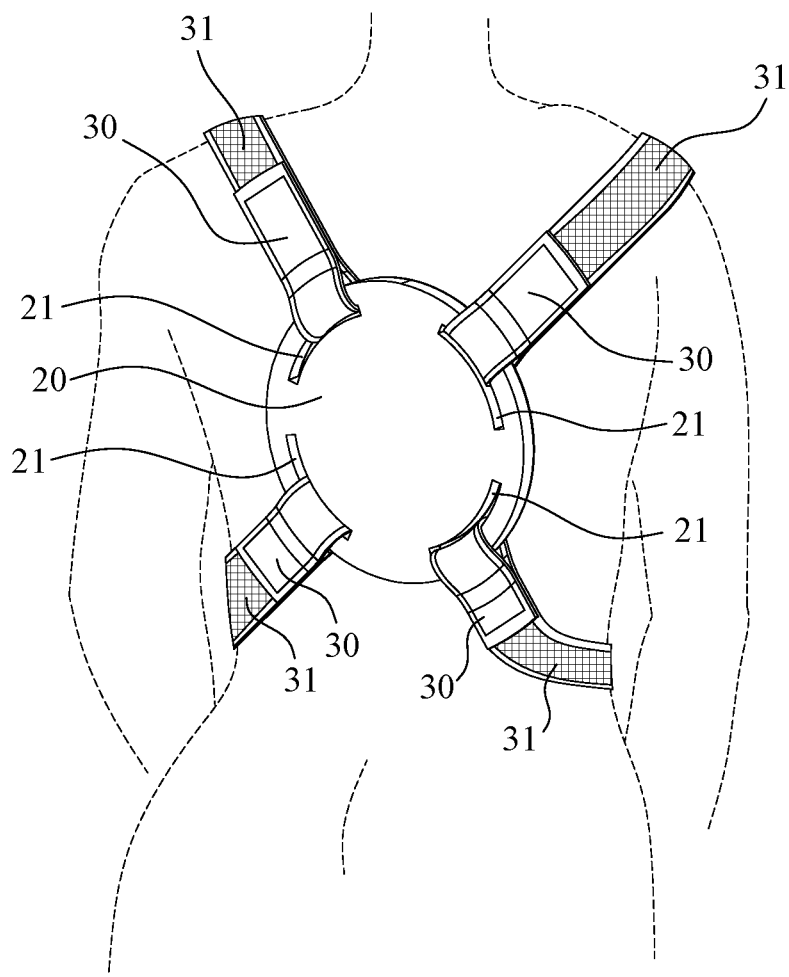
FIG. 12 is a schematic view of the second base of the present invention being worn on the back.
Figure 13:
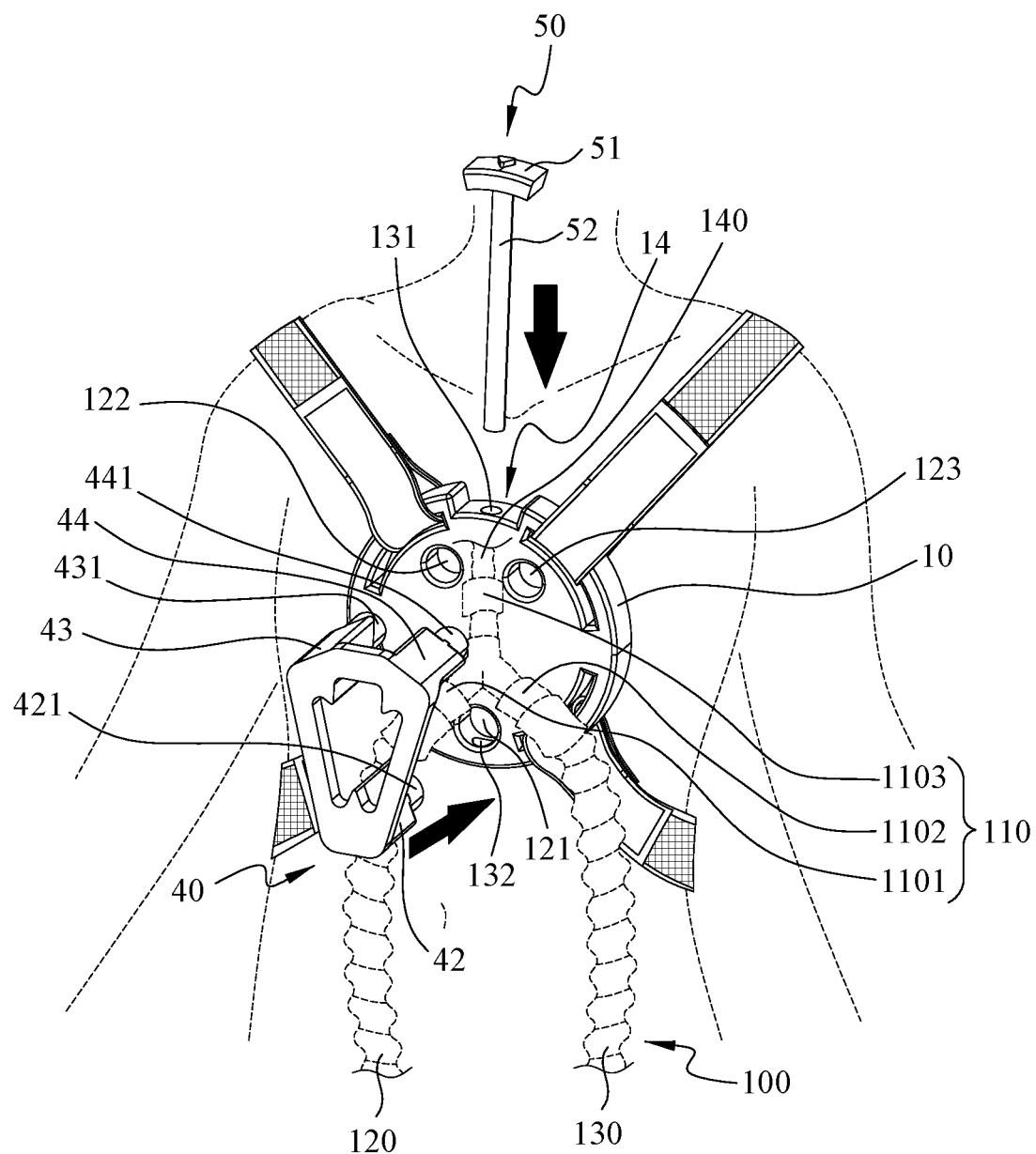
FIG. 13 is a schematic view of the respirator tube installed on the wearable support device of the present invention.
Figure 14:
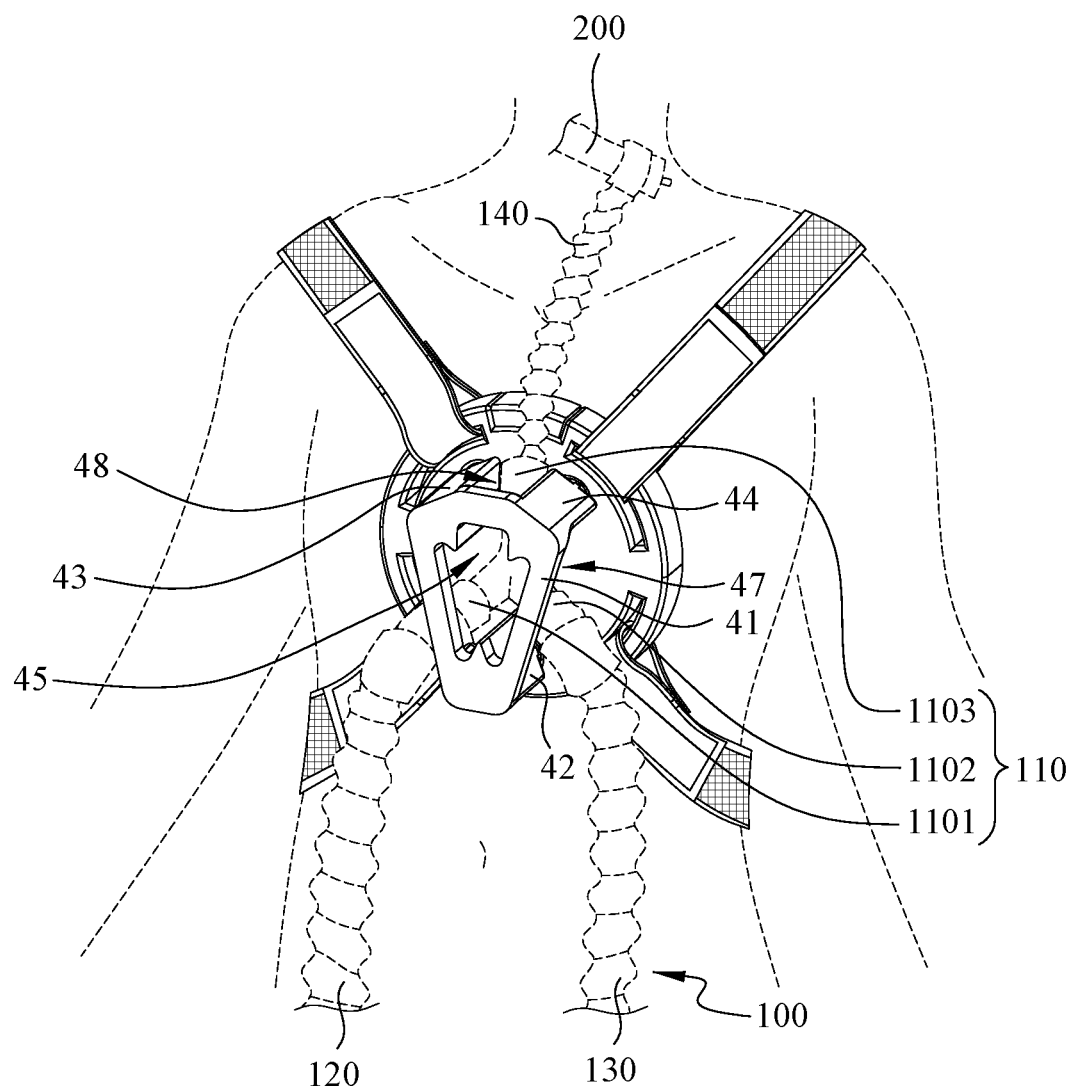
FIG. 14 is a schematic view of the wearable support device of the present invention fixing the respirator tube.
Figure 15:
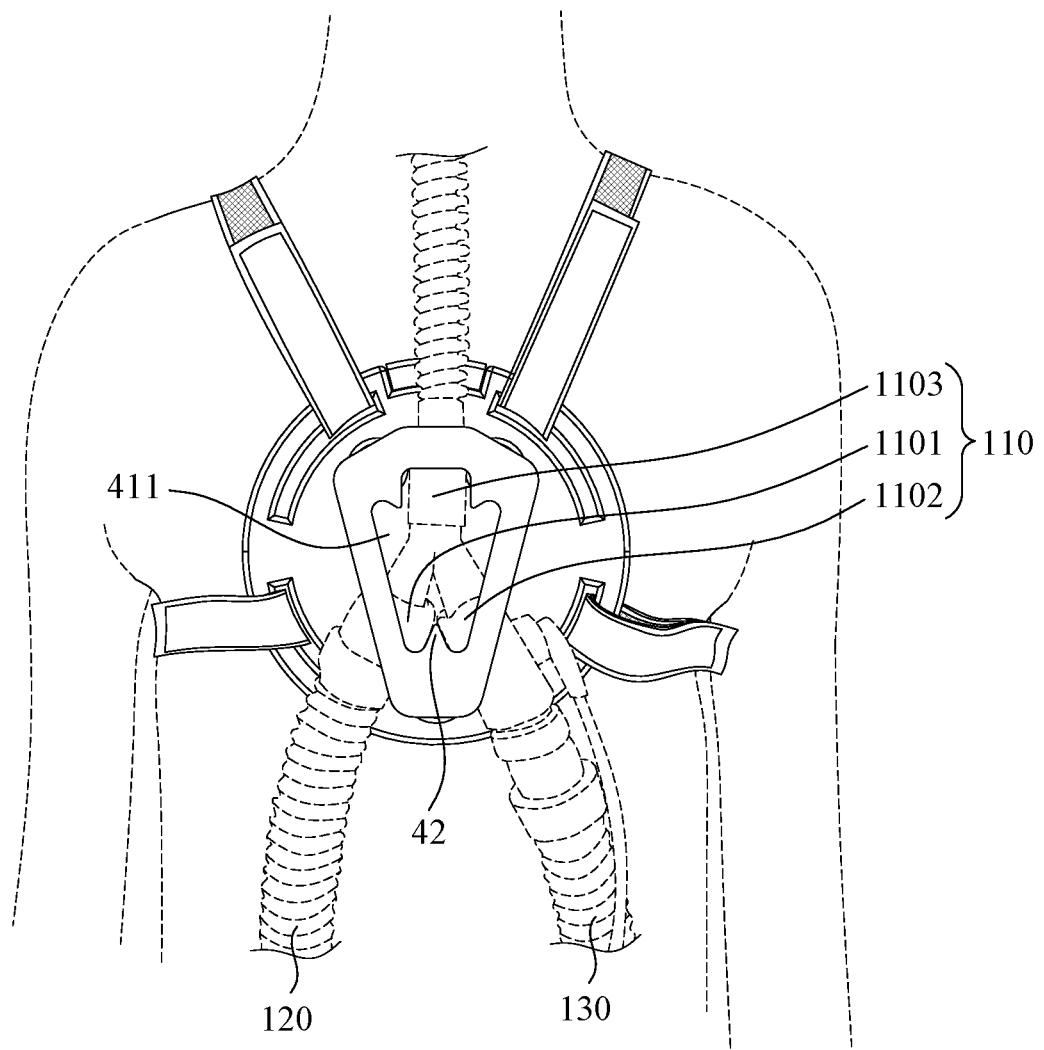
FIG. 15 is a schematic view of the wearable support device of the present invention supporting the respirator tube and the endotracheal tube.

FIG. 11 is a schematic view of the first base 10 of the present invention being worn on the front side of the chest cavity, FIG. 12 is a schematic view of the second base 20 of the present invention being worn on the back, FIG. 13 is a schematic view of the respirator tube 100 installed in the wearable support device of the present invention, FIG. 14 is a schematic view of the wearable support device of the present invention fixing the respirator tube 100, and FIG. 15 is a schematic view of the wearable support device of the present invention supporting the respirator tube 100 and the endotracheal tube 200. First, as shown in FIG. 11 and FIG. 12, the belts 30 pass through the first through holes 11 and the second through holes 21 respectively, and the belts 30 respectively go around the upper part of the shoulders and the sides of the torso. The belts 30 are tightened and fixed, so that the first base 10 is pressed against the chest cavity and the second base 20 is pressed against the back. Next, as shown in FIG. 13, a Y-shaped tube 110 of the respirator tube 100 is placed upside down on the front side of the first base 10, and the support portion 42, the first protruding portion 43, and the second protruding portion 44 of the fixed frame 40 are positioned on the first base 10. Then, as shown in FIG. 14, and referring to FIG. 7, the Y-shaped tube 110 is located in the support space 45, and a first connecting end 1101 of the Y-shaped tube 110 passes through the first through groove 46 and is connected to one end of an exhalation pipe 120 of the respirator tube 100; a second connecting end 1102 of the Y-shaped pipe 110 passes through the second through groove 47 and is connected to one end of an inhalation pipe 130 of the respirator tube 100; a third connecting end 1103 of the Y-shaped pipe 110 passes through the third through groove 48 and is connected to one end of an elbow joint 140 of the respirator tube 100. The other end of the exhalation pipe 120 and the other end of the inhalation pipe 130 are simultaneously connected to an artificial respirator (not shown in the figure), one end of the endotracheal tube 200 is connected to the other end of the elbow joint 140, and the other end of the endotracheal tube 200 is inserted into the patient's trachea through the nostrils or oral cavity (not shown). Finally, as shown in FIG. 15, the first connecting end 1101 and the second connecting end 1102 of the Y-shaped pipe 110 abut against the support portion 42.

When the patient performs early rehabilitation activities (e.g., sitting on the bedside, standing on the bedside, stepping on the bedside or getting out of bed), the patient is in an upright state, and the weight of the respirator tube 100 is propagated to the fixed frame 40 through the Y-shaped tube 110, the fixed frame 40 transfers the weight of the respirator tube 100 to the first base 10, and the first base 10 transfers the weight of the respirator tube 100 to the chest cavity. Thereby, the wearable support device of the present invention can indirectly use the chest cavity to support the weight of the respirator tube 100 to prevent the downward displacement of the Y-shaped tube 110, so that the following effects can be achieved: first, the elbow joint 140 will not be pulled downward by the Y-shaped tube 110, so that the relative position of the elbow joint 140 and the Y-shaped tube 110 is kept fixed, thereby preventing the endotracheal tube 200 from being separated from the nostril or oral cavity; second, the elbow joint 140 will not be excessively bent, reducing the resistance of inputting air by the artificial respirator so as to make the ventilation volume in the patient's body more adequate.

Furthermore, the wearing methods of the first base 10, the second base 20, and the belts 30 can obtain the following effects: first, the patient can quickly put the first base 10, the second base 20 and the belts 30 on the body in the supine sleeping position; second, the relative positions and tightness of the first base 10, the second base 20, and the belts 30 are easily adjusted, so that patients of any size can wear the wearable support device of the present invention.

In addition, the positions of the first base 10, the second base 20, and the belts 30 on the torso will neither affect the placement of other medical tubes and catheters, nor restrict the joint movement of the arms.

Moreover, the side wall 41 can block the Y-shaped tube 110 and the first protruding portion 43, the second protruding portion 44, and the support portion 42 can limit the first connecting end 1101, the second connecting end 1102, and the third connecting end 1103 of the Y-shaped tube 110. Therefore, the fixed frame 40 can provide an excellent fixation effect of the Y-shaped tube 110. When the patient performs early rehabilitation activities, the Y-shaped tube 110 will not be separated from the fixed frame 40 at all, and the exhalation tube 120 and the inhalation tube 130 will not shake.

In addition, the fixed frame 40 will not contact the elbow joint 140 and the endotracheal tube 200 at all, the elbow joint 140 and the endotracheal tube 200 will not be crushed by the fixed frame 40, and the interior of the endotracheal tube 200 will not go upwards against the throat.

As shown in FIG. 1 to FIG. 4, four first through holes 11 are provided and located at four corners of the first base 10 respectively. As shown in FIG. 1, FIG. 2, and FIG. 6, four second through holes 21 are provided and located at four corners of the second base 20 respectively. As shown in FIG. 1 and FIG. 2, four belts 30 are provided, and each belt 30 passes through one of the first through holes 11 at the corners of the first base 10 and one of the second through holes 21 at the corners of second base 20. In other words, the belts 30 are respectively fixed on the four corners of the first base 10 and the four corners of the second base 20, so that the first base 10 can firmly abut against the chest cavity and the second base 20 can firmly abut against the back, and the first base 10 and the second base 20 will not shake at all.

Preferably, each first through hole 11 is arc-shaped and the arc length is greater than the width of each belt 30, and each second through hole 21 is arc-shaped and the arc length is greater than the width of each belt 30. Therefore, the belts 30 can move along the first through holes 11 and the second through holes 21 to adjust the relative positions of the first base 10, the second base 20, and the belts 30 so that the wearable support device of the present invention can be worn by patients of any size.

Preferably, both ends of each belt 30 have a devil felt fastener 31 respectively. One end of each belt 30 passes through the first through hole 11 in one of the corners of the first base 10 and is fixed by the devil felt fastener 31, and the other end of each belt 30 passes through the second through hole 21 in one of the corners of the second base 20 and is fixed by the devil felt fastener 31. Therefore, the lengths of the belts 30 can be adjusted and the lengths of the belts 30 can be fixed by the devil felt 31 to achieve the effect of adjusting the tightness, so that patients of any size can wear the wearable support device of the present invention.

Preferably, the first base 10 and the second base 20 are both disc-shaped. However, the shapes of the first base 10 and the second base 20 are not limited thereto.

As shown in FIG. 1, FIG. 2, FIG. 3, and FIG. 7, the first base 10 is provided with three positioning grooves 121, 122, 123, and the support portion 42, the first protruding portion 43, and the second protruding portion 44 are respectively disposed with a positioning column 421, 431, 441 in a protruding manner, and the positioning columns 421, 431, 441 are inserted into the positioning grooves 121, 122, 123, respectively. Thereby, the fixed frame 40 can be fixed on the first base 10 by three positioning columns 421, 431, 441 in a three-point fixing manner, which has a fool proofing function, and the fixing effect is excellent, and no screws or hand tools are needed at all. To remove the respirator tube 100 from the wearable support device of the present invention, the user only needs to pull out the positioning columns 421, 431, 441 from the positioning grooves 121, 122, 123, so that the fixed frame 40 is separated from the first base 10, then the respirator tube 100 can be taken out. The operation is quite easy.

Preferably, the shape of each positioning column 421, 431, 441 corresponds to the shape of each positioning groove 121, 122, 123, so as to improve the fixation effect of the positioning column 421, 431, 441 to the positioning grooves 121, 122, 123. Specifically, each positioning column 421, 431, 441 is a cylinder, and each positioning groove 121, 122, 123 is a circular hole; however, the shapes of the positioning columns 421, 431, 441 and the positioning grooves 121, 122, 123 are not limited thereto, for example, the positioning columns 421, 431, 441 can be polygonal cylinders and the positioning grooves 121, 122, 123 can be polygonal holes, and so on.

As shown in FIG. 1, FIG. 2, and FIG. 9, the wearable support device of the present invention further includes a plug 50. As shown in FIG. 2 and FIG. 5, the first base 10 defines an insertion hole 13, and the insertion hole 13 penetrates through the top of the first base 10 and communicates with the positioning groove 121. As shown in FIG. 2 and FIG. 8, the positioning column 421 defines a fixed hole 4211. As shown in FIG. 1 and FIG. 10, when the positioning column 421 is inserted into the positioning groove 121, the fixed hole 4211 communicates with the insertion hole 13, and the plug 50 passes through the insertion hole 13 and the fixed hole 4211. Therefore, the plug 50 can fix the positioning column 421 in the positioning groove 121, preventing the positioning column 421 from sliding out of the positioning groove 121, and further improving the fixing effect of the fixed frame 40 and the first base 10. To remove the respirator tube 100 from the wearable support device of the present invention, the user must first pull out the plug 50 from the insertion hole 13 and the fixed hole 4211, and then pull the positioning columns 421, 431, 441 out from the positioning grooves 121, 122 and 123, so that the fixed frame 40 is separated from the first base 10, and the respirator tube 100 can be removed, which is easy to operate.

More specifically, as shown in FIG. 2 and FIG. 5, the insertion hole 13 includes a channel 131 and a latch slot 132, and the channel 131 penetrates through the top of the first base 10 and the top wall of the positioning groove 121, so that the channel 131 communicates with the positioning groove 121; the latch slot 132 penetrates the bottom wall of the positioning groove 121, so that the latch slot 132 communicates with the positioning groove 121; as shown in FIG. 8, the fixed hole 4211 penetrates the top and the bottom of the positioning column 421. As shown in FIG. 1 and FIG. 10, when the positioning column 421 is inserted into the positioning groove 121, the top of the fixed hole 4211 is aligned with the channel 131, the bottom end of the fixed hole 4211 is aligned with the latch slot 132, and the pin 50 passes through the channel 131 and the fixed hole 4211, and is fixed in the latch slot 132. Thereby, the plug 50 provides an excellent fixing effect to the positioning column 421.

Preferably, as shown in FIG. 2 to FIG. 5, the top of the first base 10 is provided with an accommodating groove 14, and the channel 131 penetrates the bottom wall of the accommodating groove 14, so that the channel 131 communicates with the accommodating groove 14. As shown in FIG. 9, the plug 50 includes a head 51 and a rod 52. When the positioning column 421 is inserted into the positioning groove 121, first, as shown in FIG. 2 and FIG. 13, the user's hand (not shown) holds the head 51, and aligns the rod 52 with the channel 131; then, as shown in FIGS. 1 and 10, the rod 52 passes through the channel 131 and the fixed hole 4211 to be fixed in the latch slot 132, and the head 51 is accommodated in the accommodating groove 14. When the user wants to remove the rod 52 from the insertion hole 13 and the fixed hole 4211, the user can pull the rod 52 out of the insertion hole 13 and the fixed hole 4211 by holding the head 51, which is easy to operate.

Preferably, the shape of the head 51 corresponds to the shape of the accommodating groove 14, so that the effect of fixing the head 51 in the accommodating groove 14 can be improved. Specifically, the head 51 is an arc-shaped block, and the accommodating groove 14 is an arc-shaped groove; however, the shapes of the head 51 and the accommodating groove 14 are not limited thereto, for example, the head 51 may be a rectangular block and accommodate groove 14 is a rectangular groove, and so on.

As shown in FIG. 15, one end of the exhalation pipe 120 and one end of the inhalation pipe 130 are located outside the fixed frame 40 and are not covered by the side wall 41. When the patient is stationary, the user can observe, from both sides of the fixed frame 40, the connection status of one end of the exhalation pipe 120 and one end of the inhalation pipe 130 with the first connecting end 1101 and the second connecting end 1102 of the Y-shaped pipe 110 to check whether it falls off or leaks. However, if the surface of the side wall 41 is fairly flat and no hollows are formed, when the patient performs early rehabilitation activities, the side wall 41 will have some blind corners, covering the first connecting end 1101 and the second connecting end 1102 of the Y-shaped tube 110, causing the user the incapability to check whether it is detached or leaked when observing the connections between one end of the exhalation pipe 120 and one end of the inhalation pipe 130 with the first connecting end 1101 and the second connecting end 1102 of the Y-shaped pipe 110. As shown in FIGS. 1, 2, 7, and 8, the side wall 41 has a hollow portion 411, and the hollow portion 411 communicates with the support space 45. As shown in FIG. 15, when the patient performs early rehabilitation activities, the user can observe the first connecting end 1101 and the second connecting end 1102 of the Y-shaped pipe 110 and the exhalation pipe 120 and the inhalation pipe 130 from the hollow portion 411 at any time to check the connection condition for falling off or air leakage; thus, there will be no blind spot problem.

As shown in FIG. 7, the support portion 42 has two inclined surfaces 422. As shown in FIG. 15, because the first connecting end 1101 of the Y-shaped pipe 110 extends to the lower left and the second connecting end 1102 of the Y-shaped pipe 110 extends to the lower right, the first connecting end 1101 of the Y-shaped pipe 110 and the second connecting ends 1102 can just abut against the two inclined surfaces 422 of the support portion 42, respectively, and the support portion 42 can support the Y-shaped tube 110 by the two inclined surfaces 422.

As shown in FIG. 7, a side surface 432 of the first protruding portion 43 and a side surface 442 of the second protruding portion 44 are close to the third through groove 48 and are parallel to each other. As shown in FIG. 15, the side surface 432 of the first protruding portion 43 and the side surface 442 of the second protruding portion 44 can restrict the third connecting end 1103 of the Y-shaped tube 110, so that the third connecting end 1103 of the Y-shaped tube 110 can be kept extending upward without shaking left and right.

Preferably, the side wall 41 is an inverted triangle-shaped block with three vertices cut flat, and the support portion 42, the first protruding portion 43, and the second protruding portion 44 are all isosceles triangle blocks. The bottoms of the support portion 42, the first protruding portion 43 and the second protruding portion 44 are respectively aligned with three edges of the side wall 41 formed by cutting the vertices flat. As such, the outline of the fixed frame 40 is relatively smooth and not acutely sharp, which can avoid injury to the patient.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wearable support device, for supporting a respirator tube and an endotracheal tube, comprising:
    a first base, disposed with a plurality of first through holes and three positioning grooves;
    a second base, disposed with a plurality of second through holes;
    a plurality of belts, each of the belts passing through one of the first through holes and one of the second through holes; and
    a fixed frame, further comprising a side wall, a support portion, a first protruding portion and a second protruding portion, the support portion, the first protruding portion, and the second protruding portion being all disposed on an inner side of the side wall and positioned on the first base, the first protruding portion and the second protruding portion being located above the support portion, a support space formed between the support portion, the first protruding portion and the second protruding portion, a first through groove formed between the support portion and the first protruding portion, a second through groove formed between the support portion and the second protruding portion, and a third through groove formed between the first protruding portion and the second protruding portion, the first through groove, the second through groove, and the third through groove respectively communicating with the support space;
    wherein the support portion, the first protruding portion and the second protruding portion are respectively protruded with a positioning column, and the positioning columns are respectively inserted in the three positioning grooves.

2. The wearable support device according to claim 1, further comprising a plug; the first base being disposed with an insertion hole, the insertion hole penetrating through the top of the first base and connected with one of the positioning grooves, the positioning column of the supporting portion being disposed with a fixed hole; and when the positioning column of the support portion is inserted into one of the positioning groves, the fixed hole being connected to the insertion hole and the plug being inserted into the insertion hole and the fixed hole.

3. The wearable support device according to claim 2, wherein the insertion hole comprises a channel and a latch slot, the channel penetrates the top of the first base and a top wall of one of the positioning grooves, so that the channel and one of the positioning grooves communicate with each other, the latch slot penetrates a bottom wall of one of the positioning grooves, so that the slot communicates with one of the positioning grooves, and the fixed hole penetrates the top and bottom of the positioning column of the support portion; and wherein, when the positioning column of the support portion is inserted into one of the positioning grooves, a top end of the fixed hole is aligned with the channel, a bottom end of the fixed hole is aligned with the latch slot, and the plug penetrates the channel and the fixed hole and is fixed in the latch slot.

4. The wearable support device according to claim 2, wherein an accommodating groove is disposed on the top of the first base, the insertion hole communicates with the accommodating groove, the plug includes a head and a rod, the head is accommodated in the accommodating groove, and the rod is inserted into the insertion hole and the fixed hole.

5. The wearable support device according to claim 1, wherein four first through holes are disposed and located at four corners of the first base, respectively; four second through holes are disposed and located at four corners of the second base, four belts are provided, and each belt passes through the first through hole at one of the corners of the first base and the second through hole at one of the corners of the second base.

6. The wearable support device according to claim 1, wherein the side wall has a hollow portion and the hollow portion communicates with the support space.

7. The wearable support device according to claim 1, wherein the support portion has two inclined surfaces, and one end where the two inclined surfaces meet faces the third through groove.

8. The wearable support device according to claim 1, wherein a side surface of the first protruding portion and a side surface of the second protruding portion are close to the third through groove and are parallel to each other.

9. The wearable support device according to claim 1, wherein the side wall is an inverted triangle-shaped block with three vertices cut flat, and the support portion, the first protruding portion, and the second protruding portion are all isosceles triangle blocks, and bottoms of the support portion, the first protruding portion, and the second protruding portion are respectively aligned with three edges of the side wall formed by cutting the vertices flat.

10. A wearable support device, for supporting a respirator tube and an endotracheal tube, comprising:
    a first base, disposed with a plurality of first through holes;

a second base, disposed with a plurality of second through holes;

a plurality of belts, each of the belts passing through one of the first through holes and one of the second through holes; and a fixed frame, further comprising a side wall, a support portion, a first protruding portion and a second protruding portion, the support portion, the first protruding portion, and the second protruding portion being all disposed on an inner side of the side wall and positioned on the first base, the first protruding portion and the second protruding portion being located above the support portion, a support space formed between the support portion, the first protruding portion and the second protruding portion, a first through groove formed between the support portion and the first protruding portion, a second through groove formed between the support portion and the second protruding portion, and a third through groove formed between the first protruding portion and the second protruding portion, the first through groove, the second through groove, and the third through groove respectively communicating with the support space;

wherein the side wall is an inverted triangle-shaped block with three vertices cut flat, and the support portion, the first protruding portion, and the second protruding portion are all isosceles triangle blocks, and bottoms of the support portion, the first protruding portion, and the second protruding portion are respectively aligned with three edges of the side wall formed by cutting the vertices flat.

* * * * *